(12) United States Patent
Arabian et al.

(10) Patent No.: US 8,950,596 B2
(45) Date of Patent: Feb. 10, 2015

(54) LOCKING GUN RACK SYSTEM WITH QUICK DEPLOYMENT

(71) Applicant: Covered 6, LLC, Simi Valley, CA (US)

(72) Inventors: Robert Arabian, Simi Valley, CA (US); Chris L. Dunn, Ventura, CA (US)

(73) Assignee: Covered 6, LLC, Simi Valley, CA (US)

( * ) Notice: Subject to any disclaimer, the term of this patent is extended or adjusted under 35 U.S.C. 154(b) by 77 days.

(21) Appl. No.: 13/833,642

(22) Filed: Mar. 15, 2013

(65) Prior Publication Data

US 2014/0263107 A1 Sep. 18, 2014

(51) Int. Cl.
| | | |
|---|---|---|
| A47F 7/00 | (2006.01) | |
| B60R 7/14 | (2006.01) | |
| A47B 81/00 | (2006.01) | |
| E05B 1/00 | (2006.01) | |
| F41A 23/00 | (2006.01) | |
| G07C 9/00 | (2006.01) | |

(52) U.S. Cl.
CPC .............. *A47B 81/005* (2013.01); *B60R 7/14* (2013.01); *E05B 1/00* (2013.01); *F41A 23/00* (2013.01); *G07C 9/00126* (2013.01); *G07C 9/00912* (2013.01)
USPC .......................................................... 211/64

(58) Field of Classification Search
USPC ............... 211/64, 8, 60.1; 42/70.11; 206/317; 70/16, 18, 19, 58, 59, 61, 62, 63; 224/913
See application file for complete search history.

(56) References Cited

U.S. PATENT DOCUMENTS

| | | | | |
|---|---|---|---|---|
| 3,876,078 | A | | 4/1975 | Gomes |
| 3,917,071 | A | | 11/1975 | Walters |
| 4,018,339 | A | | 4/1977 | Pritz |
| 4,364,499 | A | | 12/1982 | Mccue |
| 4,747,280 | A | * | 5/1988 | Shaw .......................... 70/279.1 |
| 4,936,531 | A | * | 6/1990 | Bauser ....................... 224/42.11 |
| 5,012,606 | A | * | 5/1991 | McNulty, Jr. ............... 42/70.11 |
| 5,111,755 | A | * | 5/1992 | Rouse ............................. 109/25 |
| 5,350,094 | A | * | 9/1994 | Morford ........................ 224/551 |
| 5,579,909 | A | * | 12/1996 | Deal ............................... 206/317 |
| 5,979,846 | A | * | 11/1999 | Fluhr ............................. 248/200 |
| 6,457,685 | B1 | * | 10/2002 | Taylor ........................... 248/166 |
| 6,742,687 | B2 | * | 6/2004 | Morford ........................ 224/551 |

(Continued)

OTHER PUBLICATIONS www.santacruzgunlocks.com/racks/934b.html; www.santacruzgunlocks.com/racks//916b; http://www.santacruzgunlocks.com/installation/sc-5_install.html.

*Primary Examiner* — Joshua Rodden
*Assistant Examiner* — Hiwot Tefera
(74) *Attorney, Agent, or Firm* — Adam K. Sacharoff; Much Shelist

(57) ABSTRACT

In one embodiment there is provided a long gun rack system. The system includes an L-shaped frame; a butt cap secured to the side to accommodate a butt end of the gun; a handcuff ratchet lock mechanism secured to the frame at a position to accommodate the barrel, the lock mechanism configured to unlock in response to the receipt of an electronic code or in response to a key; an electronic security mechanism secured to the frame and is in communication with the lock mechanism; and a side plate having a cut-out region is secured along the frame at a position defined between the lock mechanism and the frame, such that the cut-out region permits the plate to mount in close proximity to the long gun and blocks the removal of the takedown pins and/or the full movement of a charging handle.

20 Claims, 8 Drawing Sheets

(56) References Cited

U.S. PATENT DOCUMENTS

| | | | |
|---|---|---|---|
| 6,843,081 B1* | 1/2005 | Painter | 70/63 |
| 6,986,446 B2* | 1/2006 | Murray et al. | 224/275 |
| 7,137,511 B1* | 11/2006 | Crowell et al. | 211/4 |
| 7,200,965 B2* | 4/2007 | Vor Keller et al. | 42/70.11 |
| 7,467,719 B2* | 12/2008 | Crowell et al. | 211/64 |
| 2007/0013478 A1* | 1/2007 | Crigger et al. | 340/5.53 |
| 2008/0252414 A1* | 10/2008 | Crigger et al. | 340/5.52 |
| 2011/0162564 A1* | 7/2011 | Heim et al. | 109/48 |
| 2011/0168649 A1* | 7/2011 | Stolz | 211/4 |
| 2012/0228243 A1* | 9/2012 | Crigger et al. | 211/7 |

\* cited by examiner

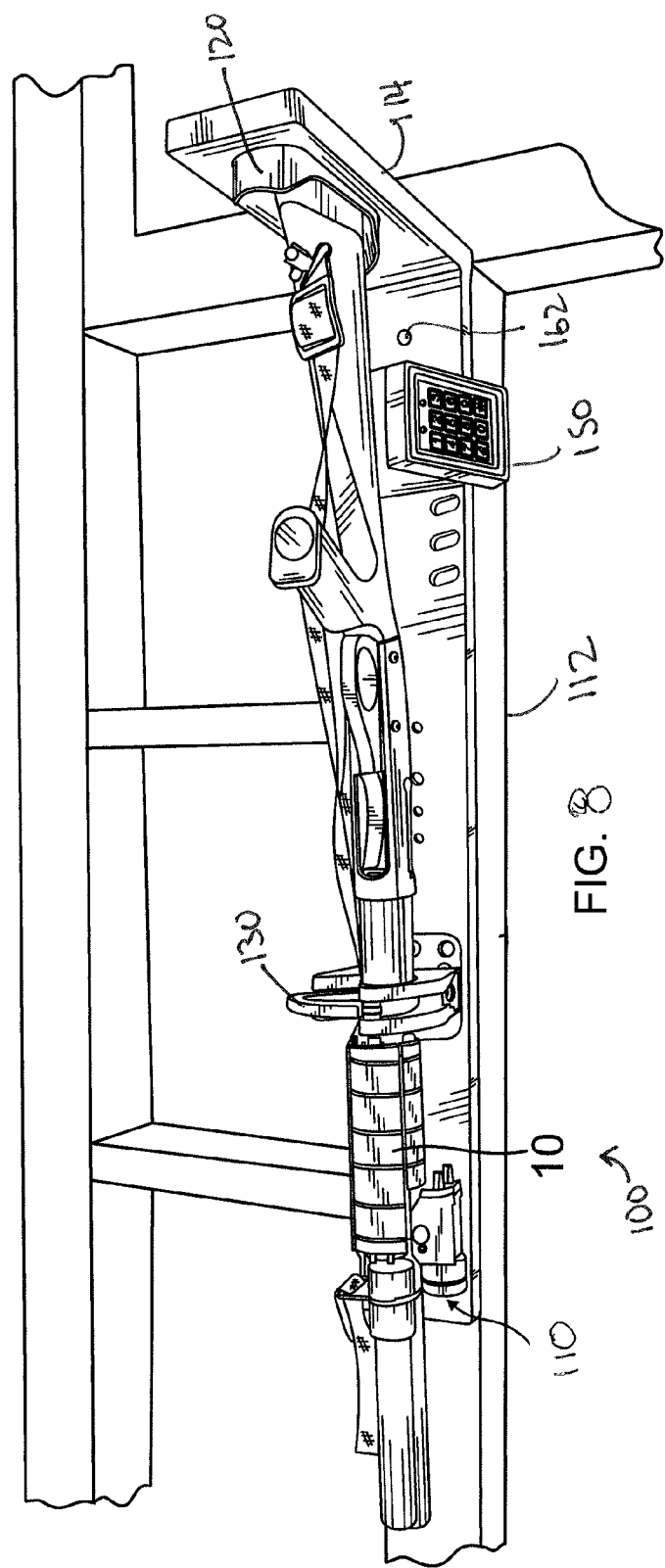

LOCKING GUN RACK SYSTEM WITH QUICK DEPLOYMENT

FIELD OF THE INVENTION

The present invention related to the field of gun rack systems and more particularly to a gun rack system that includes a quick deployment system.

BACKGROUND OF THE INVENTION

The present invention fills a void in the current marketplace, for both home defense and law enforcement/military/private security applications. Most rifle/shotgun racks for home and law enforcement use are extremely secure, but do not allow the end user to deploy the weapon system rapidly in an evolving emergency situation. While the current market has racks that allow the user to immediately deploy the rifle/shotgun, security becomes very limited.

This technology has never been adapted to a long gun rack. Most police cars in the US and around the world use a "Unitrol" type device. Simply put, an electronic wiring station in the front console of the police car to control the lights, sirens, and usually to unlock the weapons in the police cars. The weakness of the system is that a criminal or other unauthorized person can break into a running police car and start pushing switches and buttons. One of those buttons will unlock the weapons, making them accessible. Having a keypad/coded lock and or RFID/fingerprint technology prevents this from occurring. Until biometric technology is reliable and faster than it is today, the keypad/rfid design will be used. Many police cars that do not have a "Unitrol" type device, have a hidden button somewhere in the car. The button simply applies 12 volts directly to the lock. Again, if the button is located, the lock can be easily opened and weapon accessed. In addition, most undercover police cars in the US do not have a trunk mounted rack of any type. The officers place a rifle or shotgun into a soft case. One needs only compromise the trunk and they have access to the weaponry.

For the home defense market, normally large gun safes are used. They are slow and do not allow for immediate access to the weapon. Some manufacturers have wall mount racks, but none of them have power, or a secure keypad/RFID design to allow for additional security.

SUMMARY OF THE INVENTION

The current invention combines the safety currently offered in many rack systems, but provides much higher standard of security in addition to immediate deployment. As noted there are currently no long gun racks on the market with RFID/keypad/biometric technology. There are handgun "strongboxes" that are biometric, or have some form of electronic or non-electric keypad, but nothing for rifles.

In one embodiment of the present invention there is provided a gun rack assembly system configured to accommodate a long gun. The system includes an elongated rack frame defined by having an elongated base frame and an upwardly extending side frame positioned along one end of the base frame. A butt cap is secured to the side frame and configured to accommodate a butt end of the long gun. The system includes a handcuff ratchet lock mechanism secured to the base frame at a position along the base frame to accommodate a barrel end of the long gun. The handcuff ratchet lock mechanism is configured to unlock in response to the receipt of an electronic unlock code signal and in response to the receipt and turning of a key in a keyhole opening defined on the handcuff ratchet lock mechanism. Lastly, the system includes an electronic numeric keypad secured to the base frame. The keypad is in communication with the handcuff ratchet lock mechanism, and is configurable to store at least one numeric keycode corresponding to the electronic unlock code signal. As such when the numeric keycode is entered on the electronic numeric keypad, the electronic unlock code signal is sent to the handcuff ratchet lock mechanism such that the handcuff ratchet lock mechanism unlocks.

In other embodiment of the present invention there is provided a side mounting plate secured along the base frame and extending upwardly. The side mounting plate is positioned between the handcuff ratchet lock mechanism and the side frame and is configured such that the side mounting plate blocks at least a portion of a charging handle defined on the long gun from being moved to chamber a round into the long gun. The side mounting plate may further include a cut-out region along a portion of the plate. The cut-out region is configured to permit the plate to mount in close proximity to the long gun and configured to block the removal of the takedown pins and/or permit the charging handle to be received in the cut-out region while preventing the full movement of the charging handle. In some aspects of the invention, the side mounting plate includes a base plate for mounting the side mounting plate to the base frame, and includes a side plate extending from an edge of the base plate, wherein the side plate includes the cut-out region.

The invention further permits the adjustment of the handcuff ratchet lock mechanism and/or the side mounting plate by providing various openings for attachment.

Numerous other advantages and features of the invention will become readily apparent from the following detailed description of the invention and the embodiments thereof, from the claims, and from the accompanying drawings.

DESCRIPTION OF THE DRAWINGS

A fuller understanding of the foregoing may be had by reference to the accompanying drawings, wherein:

FIG. 8 is a front side perspective view of a gun rack system having quick deployment capabilities in accordance with one embodiment of the present invention.

DETAILED DESCRIPTION OF THE EMBODIMENTS

Figure 1:
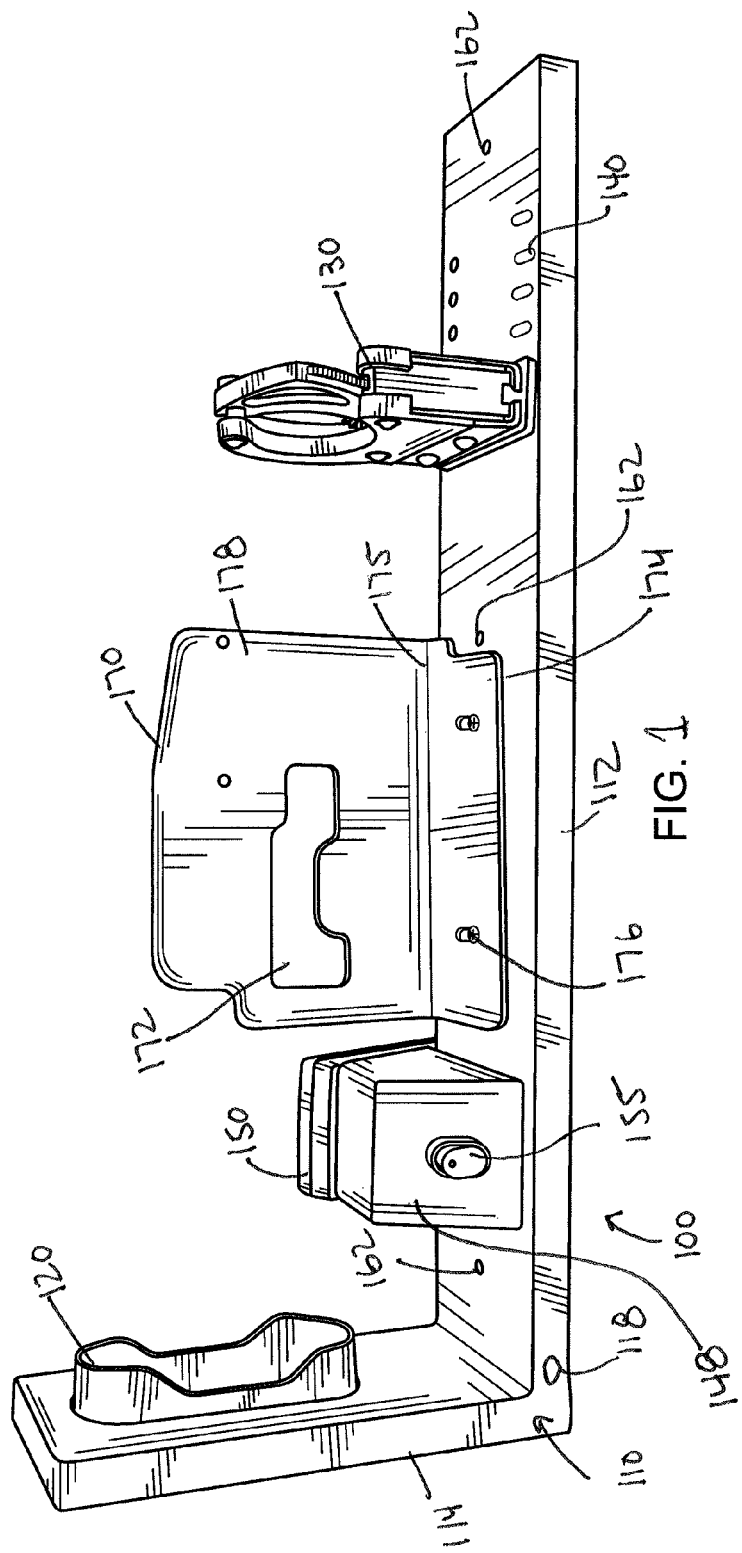
FIG. 1 is a rear side perspective view of a gun rack system having quick deployment capabilities in accordance with one embodiment of the present invention.

While the invention is susceptible to embodiments in many different forms, there are shown in the drawings and will be described herein, in detail, the preferred embodiments of the present invention. It should be understood, however, that the present disclosure is to be considered an exemplification of the principles of the invention and is not intended to limit the spirit or scope of the invention and/or the embodiments illustrated.

Figure 2:
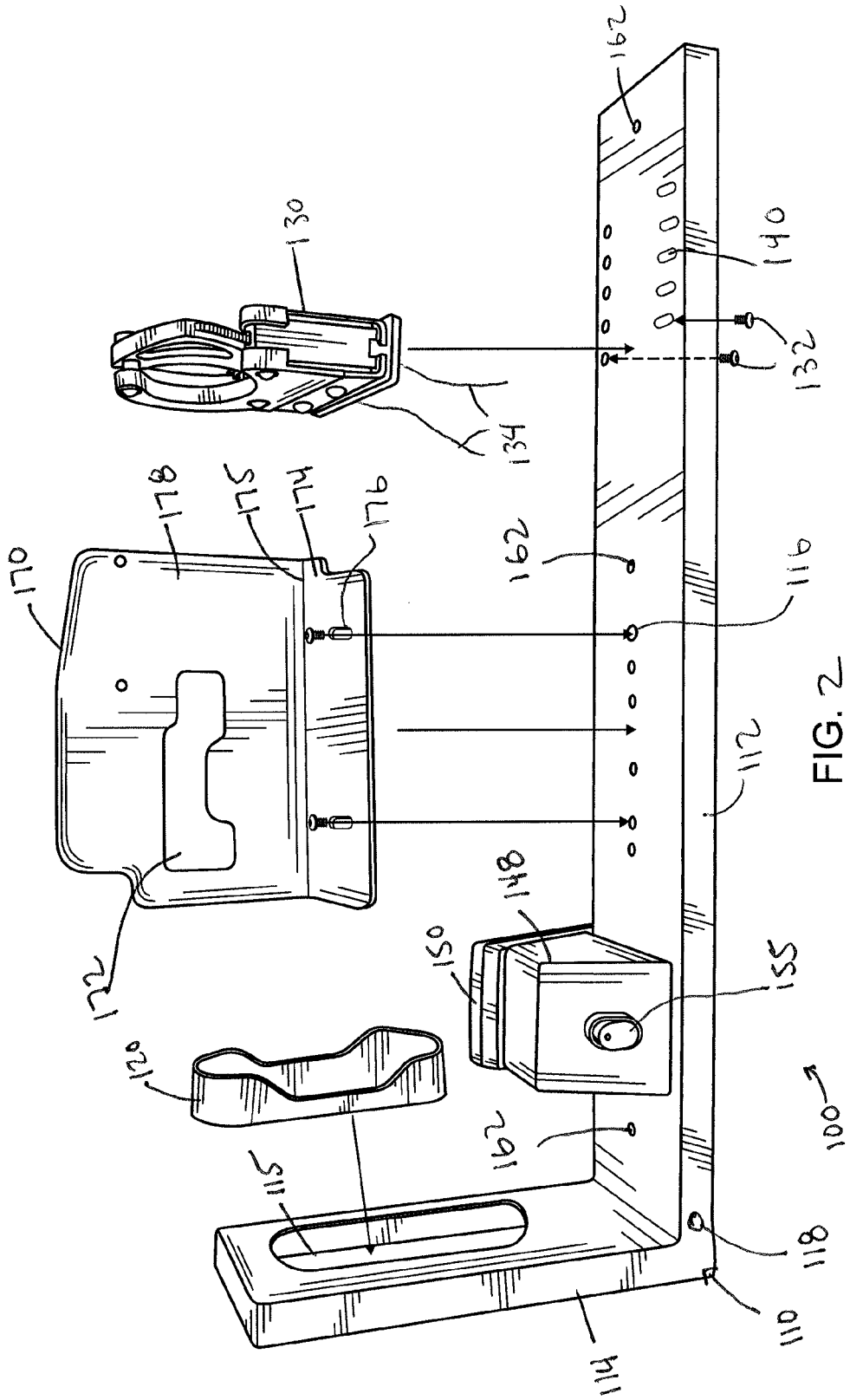
FIG. 2 is an exploded view of a gun rack system having quick deployment capabilities in accordance with one embodiment of the present invention.
Figure 3:
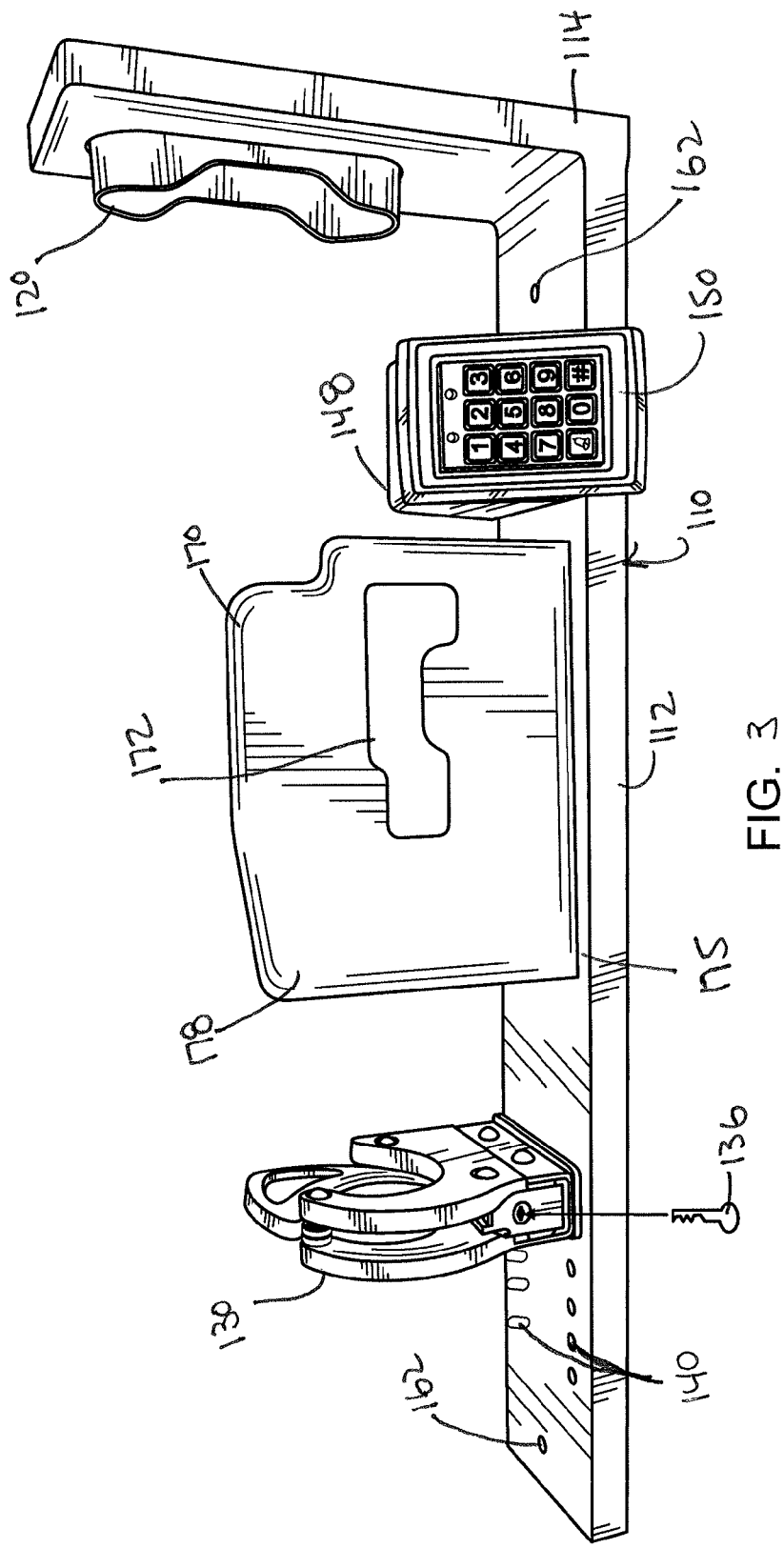
FIG. 3 is a front side perspective view of a gun rack system having quick deployment capabilities in accordance with one embodiment of the present invention.
Figure 4:
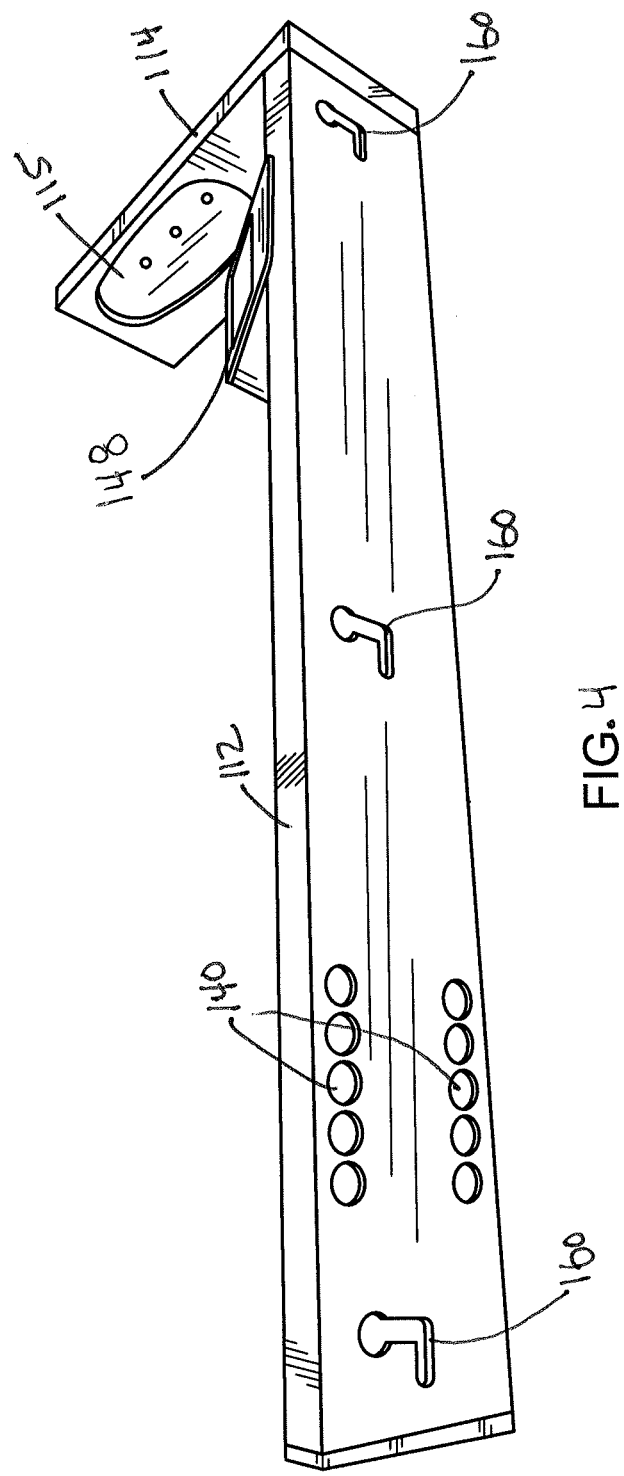
FIG. 4 is a bottom perspective view of a gun rack system having quick deployment capabilities in accordance with one embodiment of the present invention.
Figure 5:
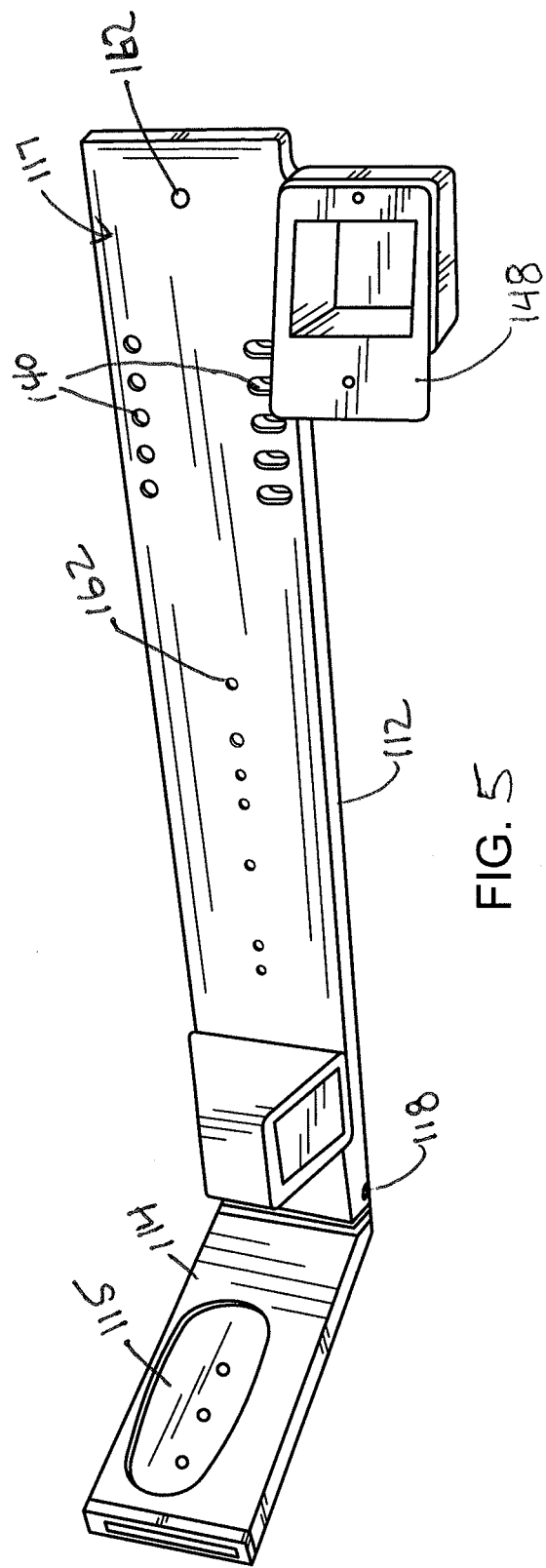
FIG. 5 is a top perspective view of a rack frame in accordance with one embodiment of the present invention.
Figure 6:
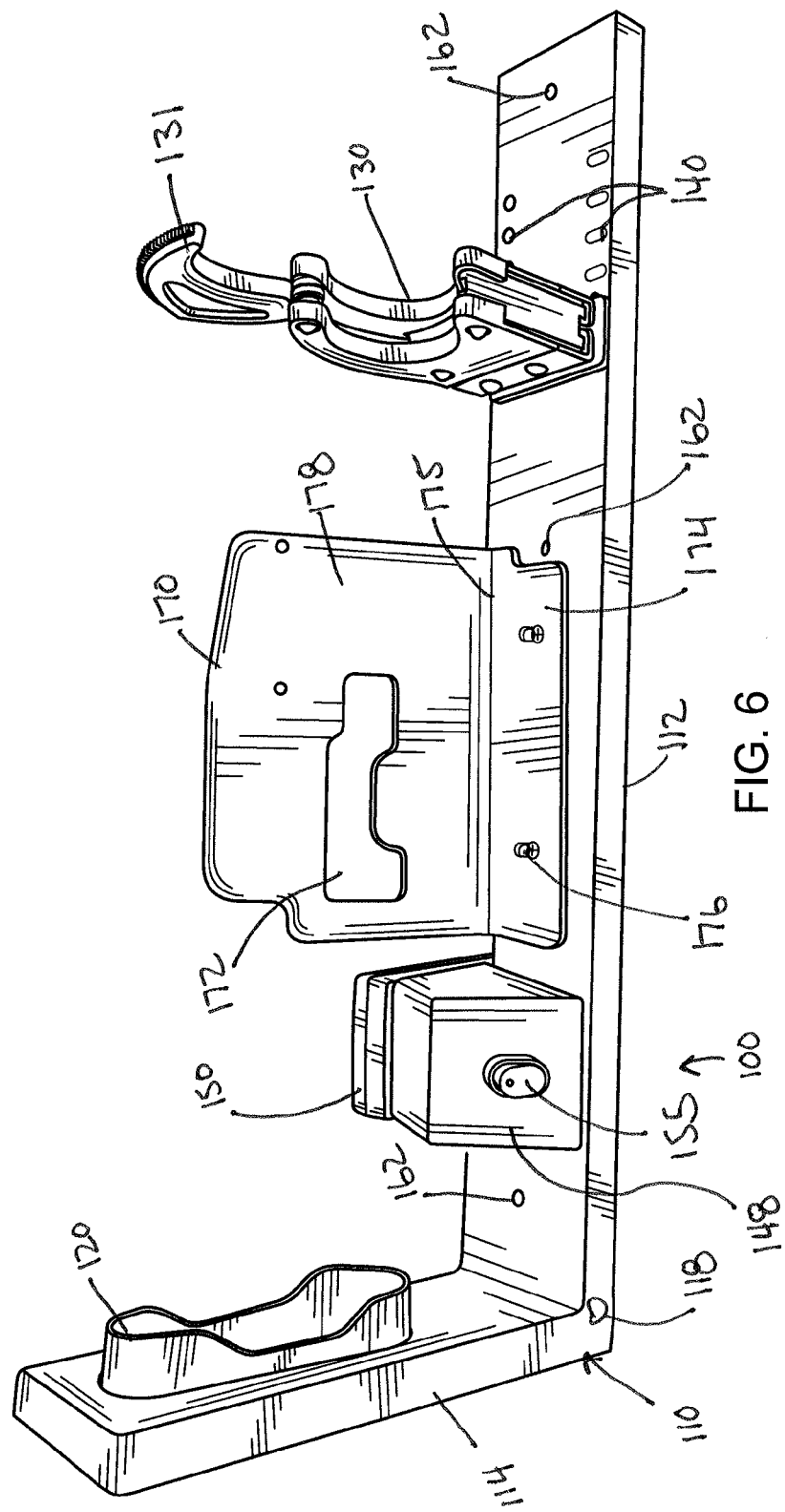
FIG. 6 is a rear side perspective view of a gun rack system having quick deployment capabilities in accordance with one embodiment of the present invention.
Figure 7:
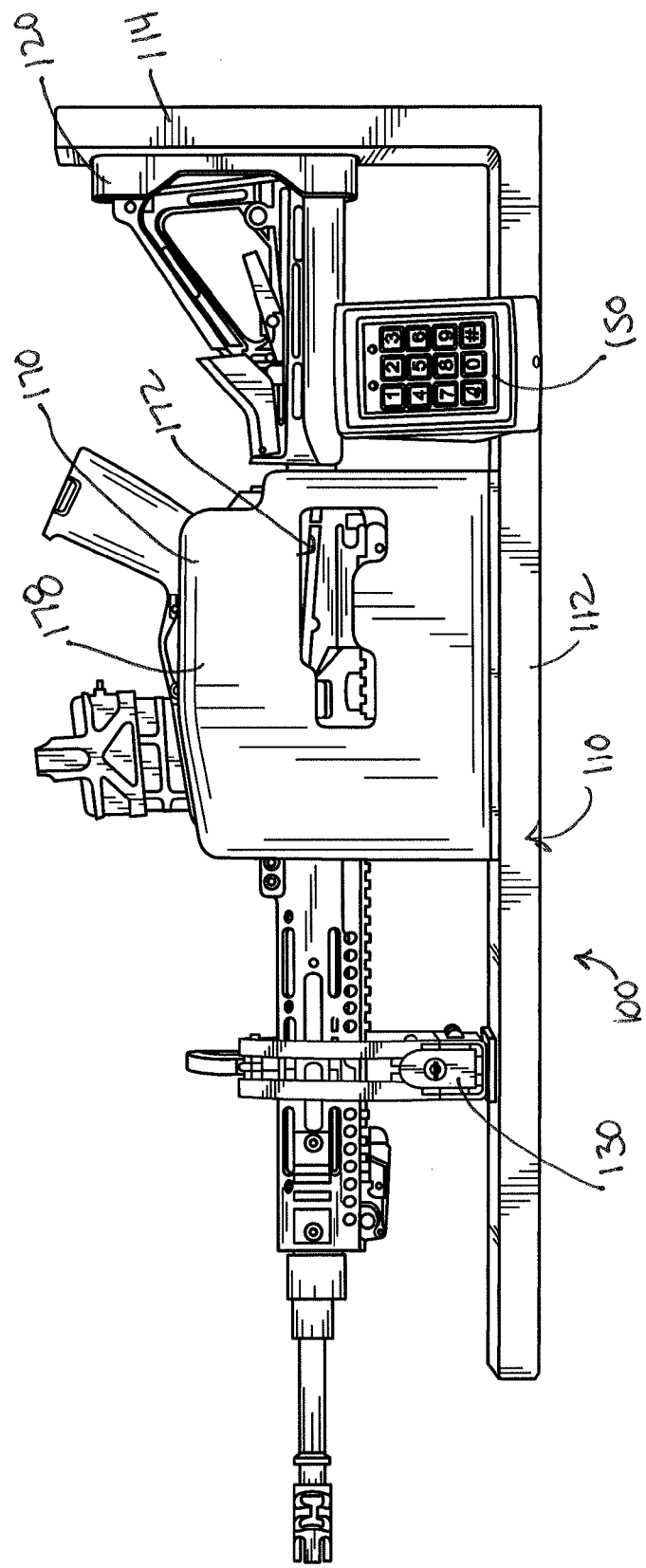
FIG. 7 is a front side perspective view of a gun rack system having quick deployment capabilities in accordance with one embodiment of the present invention.

Referring now to FIGS. 1 through 9, there is shown a gun rack assembly 100 in accordance with various embodiments of the present invention, employed with a rifle or long gun 10. The gun rack assembly 100 is powered by any twelve (12) volt power supply (not shown). Any vehicle electric system, or the supplied power supply/adapter will power the system. It can also be battery powered, or have a battery back-up system spliced in line in case of power failure.

The gun rack assembly 100 includes a L shaped style rack frame 110, formed by having a base frame 112 running along the length of the rack assembly 100 and an upwardly extending side frame 114 positioned along one end of the base frame 112. The side frame 114 includes a butt cap 120 that is secured into an indented region 115 defined in the side frame 114. The butt cap 120 sized to receive the butt of the gun. The base frame 112 may be made from any secured type material that would normally prevent tampering, such as a strong tensile metal or composite.

The gun rack assembly 100 also includes a handcuff style ratchet lock mechanism 130 at an end of the base frame 112 that is diametrically opposed to the side frame 114. Openings 140 are positioned along the base frame 112 towards the ratchet lock attachment region such that the ratchet lock 130 can be moved along the rack frame to accommodate different gun and rifle lengths. For instance, on a shotgun, the lock would need to be placed just below the "Pump" to prevent it from being operated and a live round chambered while the shotgun is in the rack. To move the lock, it must first be removed, by loosening mounting screws 132 from the underneath the base frame 112. The lock has a power and ground wire 134, that will run into the frame. The wires are hidden inside the frame between the lock 130 and the keypad 150. To move the lock, one would loosen the mounting screws 132 and remove the lock 130. Gently, the wire can be pulled out of the openings 140 where it will lead to a small plastic connection. The connection can be unplugged and then moved to the appropriate oval along the frame. The user then re-plugs the lock side into the connection. The wire is then pushed back into the frame of the rack, and the 2 mounting screws 132 are secured into the lock, fastening it back onto the frame. The lock is similar to the Model SC-5 Universal Gun Lock manufactured by Santa Cruz Gunlocks, LLC.

An electronic numeric keypad 150 is also used and secured to the base frame 112 via a keypad support bed 148, and which may be programmable to numerous different users all with separate combinations. In other aspects, the last code entered can be stored such that during a diagnostic testing of the keypad the information can be retrieved, if needed. The keypad is in communication with the lock 130 such that the lock will open in response to a properly stored programmed code. The keypad also has a built in RFID (Radio Frequency) reader, and can read RFID transmitters to unlock the lock. The keypad is wired between the power supply and the lock. All wires are hidden within the frame or base board 112 of the device to prevent tampering.

The keypad 150 may also be mounted in a horizontal or vertical fashion. Vertical for homes (FIG. 5) such as wall mounted or side of a gun safe; and horizontal more for vehicle trunks or the top of a safe; inside a cabinet or credenza etc. In the vertical mount the keypad 150 is moved along the base frame 112 about the end 117 opposite the side frame 114 and is mounted to a keypad support bed 148.

As noted the handcuff style ratchet lock 130 is secured to the base frame 112, powered by the power source, and in communication with the keypad 150, as mentioned above. At this point, the lock 130 when closed will open for a proper code or a properly programmed RFID transmitter. In addition, the lock has a key 136 as a fail-safe, which will also work in case of total power loss.

In practice, the long gun is placed into the rack and firmly rests the butt stock into the butt cup receptacle at the "L" shaped end of the device. Once firmly in place, the user opens the handcuff style ratchet lock and places the barrel end of the long gun into the lock. The user closes the lock and engages the teeth to the handcuff style hasp.

To unlock, the user simply inputs 4 numbers to unlock the lock, or places the RFID transmitter in close proximity to the keypad to unlock the lock. The user then simply pulls open the hinged portion 131 of the handcuff style hasp and the long gun is then immediately accessible. If the user decides not to remove the long gun, the user simply pushes the hinged portion of the hasp closed and ensures the lock is engaged.

Other aspects of the present embodiment include the fact that all wiring is placed inside the frame between the keypad and the lock. The wiring harness is sealed in a shrink tube so it cannot be easily "fished" out and 12 volts directly applied to the lock. Most manufactured electric racks have exposed wiring.

A rigid frame constructions such as but not limited to aluminum or stainless steel or titanium frame. The "L" shape of the frame accounts for significantly more strength than other racks on the market. It can be mounted to vehicles or walls through various mounting holes 160.

A very important aspect of one or more of the embodiments, includes a chamber block. For example, the keypad location on the "horizontal" model also serves to block the charging handle on an AR-15 style rifle. When the charging handle is pulled to the rear, this keypad mounting point serves to block the charging handle from full travel, thusly preventing a user to chamber a live round when the device is placed into the rack.

Another aspect of one or more of the embodiments, includes On/Off switch 155 for horizontal models. Power can be supplied externally and connected to the rack 100 through a connected plug 118 located on the base frame 112.

Another aspect of one or more of the embodiments, includes a side mounting plate 170 with a cut-out region 172. The plate 170 is mounted along one side of the base frame 112. The side mounting plate 170 includes a flat base plate 174 with apertures 176. The lower section 174 rests on the base frame 112 with the openings 176 aligning with openings 116 on the base frame 112 such that the plate 170 can be secured to the base frame 112. Extending from an edge 175 of the lower section is a side plate 178 with the cut-out region 172.

The plate 170 accomplishes several things. Firstly, if properly mounted, it serves to capture a portion of the charging handle of an AR-15 or other weapon system in order to prevent the charging handle from being drawn rearward and allowing a live round to be chambered into the weapon while it is mounted. This is an additional safety device in case the particular rifle is mounted higher in the rack and the keypad chamber block does not catch the charging handle. In addition, and of significant importance, on an AR-15 weapon system, the rifle is disassembled by pushing out 2 pins (forward pin and rearward pin) which breaks the weapon down into 2 sets: the upper receiver and the lower receiver. Nearly all rack systems in place in police cars with the exception of the "Bin Rack" allow for the rifle to be stolen in under 30 seconds. One simply breaks into the police car, and "pushes" the forward and rearward pins from the receiver with a ball point pen or small screwdriver. The rifle lower receiver can then be removed. The side mounting plate blocks both the forward pin and rearward pin from being removed while securely locked in the rack. Yet further, the side mounting plate with cut-out is fit tight enough to the rifle, to prevent a person from ejecting the magazine from the rifle. This prevents theft of ammunition. The cut-out region allows the plate 170 to mount close enough to the rifle to serve as a block for the pins to be removed; as well as capture the charging handle so the rifle cannot chamber a live round.

The base frame 112 also has 3 sets of openings 116 for the side mounting plate 170. This provides sufficient adjustment for different rifle types to be accommodated within the rack.

The rack system 100 also includes 3 distinct mounting holes 160 positioned on the bottom of the base frame 112. The mounting holes allow for the rack to be mounted on top of 3 screw heads from the bottom only. The mounting holes 160 in the bottom allow the head of the screw to be inserted, and then locked into position. The hole on the opposite side of the bottom (top) have holes which are smaller, meaning the bolts holding the rack to any particular surface cannot be removed from the top of the rack, they must be loosened, and then the entire rack unlocked from the 3 keyholes to remove it. This provides tamper resistance, wherein an unauthorized user trying to remove the rack cannot drive the screws out from the top, they must come from the bottom. In essence, if mounting to a wall, one would measure the locations of the keyholes. They would then drive the screws into the wall, leaving them protruding ¼ inch. Once all 3 screws are in the wall, the user would mount the rack over the screws, and then slide it into position so the screw heads could be seen through the top of the base frame 112 through smaller access openings 162. A security bit, bit driver, or Allen Wrench (not shown) depending upon the type of fastening used would then be fed through the top to tighten the screw securing the entire assembly to the wall.

Once the rack is mounted, and a long gun is in place, the mounting screws become inaccessible due to the stock and receiver blocking 2 of the mounting holes completely. On some configurations, the side mounting plate 170 completely covers the access hole 162. The barrel on most configurations also covers the top mounting hole, thusly providing high security to the entire system. Most mounts have accessible mounting screws and can be disassembled quite easily.

In other aspects of the invention, the keypad or other devices capable of unlocking the lock may be done by using finger print identification, voice recognition, Bluetooth, Wi-Fi, and/or 3g/4g cellular systems. Some of these aspects may be able to communicate with the device from a remote location. In addition, in these and other embodiments it may be further needed to unlock the device from a remote location, or have the system send a text SMS message to the owner if it is tampered with such as a power failure, or an unauthorized code was entered.

From the foregoing and as mentioned above, it will be observed that numerous variations and modifications may be effected without departing from the spirit and scope of the novel concept of the invention. It is to be understood that no limitation with respect to the specific methods and apparatus illustrated herein is intended or should be inferred.

We claim:

1. A gun rack assembly system configured to accommodate a long gun, the system comprising:

an elongated rack frame defined by having an elongated base frame and an upwardly extending side frame positioned along one end of the base frame;
a butt cap secured to the side frame and configured to accommodate a butt end of the long gun;
a handcuff ratchet lock mechanism secured to the base frame at a position along the base frame to accommodate a barrel end of the long gun, the handcuff ratchet lock mechanism being configured to unlock in response to the receipt of an electronic unlock code signal and in response to the receipt and turning of a key in a keyhole opening defined on the handcuff ratchet lock mechanism;
an electronic numeric keypad secured to the base frame and being in communication with the handcuff ratchet lock mechanism, the electronic numeric keypad being configurable to store at least one numeric keycode corresponding to the electronic unlock code signal, wherein when the numeric keycode is entered on the electronic numeric keypad, the electronic unlock code signal is sent to the handcuff ratchet lock mechanism such that the handcuff ratchet lock mechanism unlocks; and
a side mounting plate secured along the base frame and extending upwardly at a position between the handcuff ratchet lock mechanism and the side frame, the position between the handcuff ratchet lock mechanism and the side frame being configured such that the side mounting plate blocks at least a portion of a charging handle defined on the long gun from being moved to chamber a round into the long gun,
wherein the side mounting plate further includes a cut-out region along a portion of the plate, the cut-out region configured to permit the plate to mount in close proximity to the long gun and configured to block the removal of the takedown pins and permit the charging handle to be received in the cut-out region while preventing the full movement of the charging handle, and wherein the side mounting plate further includes a base plate for mounting the side mounting plate to the base frame, and further includes a side plate extending from an edge of the base plate, wherein the side plate includes the cut-out region.

2. The system of claim 1, wherein the side frame includes an indented region sized to accommodate a bottom portion of the butt cap and wherein the butt cap is secured within the indented region to the side frame.

3. The system of claim 1, wherein the handcuff ratchet lock mechanism is at a position about an end that is diametrically opposed to the side frame.

4. The system of claim 1, wherein the base frame includes at least two sets of base frame handcuff mounting openings, such that the handcuff ratchet lock mechanism is removable from a first position along the base frame and is configurable to secure to a second position along the base frame.

5. The system of claim 1, wherein the electronic numeric keypad includes a radio frequency identification reader configured to receive an unique radio frequency identification signal corresponding to the electronic unlock code signal, such that the handcuff ratchet lock mechanism unlocks when the electronic numeric keypad receives the unique radio frequency identification signal.

6. The system of claim 1, wherein the electronic numeric keypad is secured to the base frame at a position adjacent to the side frame or secured to the base frame at a position adjacent to the handcuff ratchet lock mechanism.

7. A gun rack assembly system configured to accommodate a long gun, the system comprising:

an elongated rack frame defined by having an elongated base frame and an upwardly extending side frame positioned along one end of the base frame;

a butt cap secured to the side frame end configured to accommodate a butt end of the long gun;

a handcuff ratchet lock mechanism secured to the base frame at a position along the base frame to accommodate a barrel end of the long gun, the handcuff ratchet lock mechanism being configured to unlock in response to the receipt of an electronic unlock code signal and in response to the receipt and turning of a key in a keyhole opening defined on the handcuff ratchet lock mechanism; and an electronic numeric keypad secured to the base frame and being in communication with the handcuff ratchet lock mechanism, the electronic numeric keypad being configurable to store at least one numeric keycode corresponding to the electronic unlock code signal, wherein when the numeric keycode is entered on the electronic numeric keypad, the electronic unlock code signal is sent to the handcuff ratchet lock mechanism such that the handcuff ratchet lock mechanism unlocks, and wherein the electronic numeric keypad is mounted to a keypad support bed that is secured to the base frame, the keypad support bed further includes an upper surface that is configured to receive a portion of the long gun when the long gun is positioned in the system.

8. The system of claim 7, further comprising a side mounting plate that includes a cut-out region along a portion of the plate, the cut-out region configured to permit the plate to mount in close proximity to the long gun and configured to block the removal of the takedown pins and permit the charging handle to be received in the cut-out region while preventing the full movement of the charging handle.

9. The system of claim 8 wherein the side mounting plate further includes a base plate for mounting the side mounting plate to the base frame, and further includes a side plate extending from an edge of the base plate, wherein the side plate includes the cut-out region.

10. The system of claim 7, wherein the side frame includes an indented region sized to accommodate a bottom portion of the butt cap and wherein the butt cap is secured within the indented region to the side frame.

11. The system of claim 7, wherein the handcuff ratchet lock mechanism is at a position about an end that is diametrically opposed to the side frame.

12. The system of claim 7, wherein the base frame includes at least two sets of base frame handcuff mounting openings, such that the handcuff ratchet lock mechanism is removable from a first position along the base frame and is configurable to secure to a second position along the base frame.

13. The system of claim 7, wherein the electronic numeric keypad includes a radio frequency identification reader configured to receive an unique radio frequency identification signal corresponding to the electronic unlock code signal, such that the handcuff ratchet lock mechanism unlocks when the electronic numeric keypad receives the unique radio frequency identification signal.

14. The system of claim 7, wherein the electronic numeric keypad is secured to the base frame at a position adjacent to the side frame or secured to the base frame at a position adjacent to the handcuff ratchet lock mechanism.

15. A gun rack assembly system configured to accommodate a long gun, the system comprising:

an elongated rack frame defined by having an elongated base frame and an upwardly extending side frame positioned along one end of the base frame;

a butt cap secured to the side frame and configured to accommodate a butt end of the long gun;

a handcuff ratchet lock mechanism secured to the base frame at a position along the base frame to accommodate a barrel end of the long gun, the handcuff ratchet lock mechanism being configured to unlock in response to the receipt of an electronic unlock code signal and in response to the receipt and turning of a key in a keyhole opening defined on the handcuff ratchet lock mechanism;

an electronic numeric keypad secured to the base frame and being in communication with the handcuff ratchet lock mechanism, the electronic numeric keypad being configurable to store at least one numeric keycode corresponding to the electronic unlock code signal, wherein when the numeric keycode is entered on the electronic numeric keypad, the electronic unlock code signal is sent to the handcuff ratchet lock mechanism such that the handcuff ratchet lock mechanism unlocks, and wherein the electronic numeric keypad is mounted to a keypad support bed that is secured to the base frame, the keypad support bed further includes an upper surface that is configured to receive a portion of the long gun when the long gun is positioned in the system; and a side mounting plate secured along the base frame and having a side plate extending upwardly from the base frame, the side plate having a cut-out region, and wherein the side mounting plate is secured along the base frame at a position defined between the handcuff ratchet lock mechanism and the side frame, such that the cut-out region permits the plate to mount in close proximity to the long gun and blocks the removal of the takedown pins defined by the long gun and blocks the full movement of a charging handle defined by the long gun.

16. The system of claim 15, wherein the side frame includes an indented region sized to accommodate a bottom portion of the butt cap and wherein the butt cap is secured within the indented region to the side frame.

17. The system of claim 15, wherein the handcuff ratchet lock mechanism is at a position about an end that is diametrically opposed to the side frame.

18. The system of claim 15, wherein the base frame includes at least two sets of base frame handcuff mounting openings, such that the handcuff ratchet lock mechanism is removable from a first position along the base frame and is configurable to secure to a second position along the base frame.

19. The system of claim 15, wherein the electronic numeric keypad includes a radio frequency identification reader configured to receive an unique radio frequency identification signal corresponding to the electronic unlock code signal, such that the handcuff ratchet lock mechanism unlocks when the electronic numeric keypad receives the unique radio frequency identification signal.

20. The system of claim 15, wherein the electronic numeric keypad is secured to the base frame at a position adjacent to the side frame or secured to the base frame at a position adjacent to the handcuff ratchet lock mechanism.

* * * * *